(12) United States Patent
Lindgren

(10) Patent No.: US 10,479,140 B2
(45) Date of Patent: Nov. 19, 2019

(54) WHEEL LIFTING DEVICE

(71) Applicant: AB Kompositprodukter Vikmanshyttan, Vikmanshyttan (SE)

(72) Inventor: Mats Lindgren, Vikmanshyttan (SE)

(73) Assignee: AB Kompositprodukter Vikmanshyttan, Vikmanshyttan (SE)

( * ) Notice: Subject to any disclaimer, the term of this patent is extended or adjusted under 35 U.S.C. 154(b) by 28 days.

(21) Appl. No.: 15/970,184

(22) Filed: May 3, 2018

(65) Prior Publication Data
US 2018/0319212 A1    Nov. 8, 2018

(30) Foreign Application Priority Data
May 5, 2017   (SE) ...................................... 1750547

(51) Int. Cl.
*B60B 29/00* (2006.01)
*B60B 30/02* (2006.01)
(Continued)

(52) U.S. Cl.
CPC .......... *B60B 29/002* (2013.01); *B60B 29/001* (2013.01); *B60B 30/02* (2013.01);
(Continued)

(58) Field of Classification Search
CPC ..... B60B 29/002; B60B 29/001; B60B 30/02; B60B 30/06; B60B 30/10; B60B 2340/36
See application file for complete search history.

(56) References Cited

U.S. PATENT DOCUMENTS 2,490,233 A * 12/1949 Schildmeier .......... B60B 29/002
  414/427
2,502,285 A *  3/1950 Smith .................... B60B 29/002
  254/10 R
(Continued)

FOREIGN PATENT DOCUMENTS

DE        19607703 A1 *  9/1997  ........... B60B 29/002
FR          923551 A      7/1947
(Continued)

OTHER PUBLICATIONS

Final Notice and Search Report for Swedish Application No. 1750547-0 dated Dec. 13, 2017, 26 pages.

*Primary Examiner* — Kaitlin S Joerger
(74) *Attorney, Agent, or Firm* — RMCK Law Group, PLC

(57) ABSTRACT

A wheel lifting device comprising a base structure with support means for being supported by a ground surface and a lifting frame with at least one wheel support member and a frame leg which extends upwardly at an angle to the ground surface. A link mechanism is connected to the base structure and to the lifting frame and a pivotal manoeuvring lever is connected to the link mechanism for lifting the lifting frame relative to the base structure. The blocking device for locking the manoeuvring lever at any desired pivotal position comprises a weight which is slidable along the frame leg and arranged to intersect the pivotal movement path of the manoeuvring lever and to be brought into frictional engagement with the frame leg when influenced by a force generated by the manoeuvring lever in order to block the lifting frame from downward movement relative to the base structure.

17 Claims, 4 Drawing Sheets

(51) Int. Cl.
*B60B 30/06* (2006.01)
*B60B 30/10* (2006.01)
*B62B 3/06* (2006.01)

(52) U.S. Cl.
CPC .............. *B60B 30/06* (2013.01); *B60B 30/10* (2013.01); *B62B 3/0631* (2013.01); *B60B 2340/36* (2013.01); *B62B 2202/031* (2013.01); *B62B 2203/10* (2013.01)

(56) References Cited

U.S. PATENT DOCUMENTS

| | | |
|---|---|---|
| 2,570,587 A | 10/1951 | Noone et al. |
| 3,441,157 A * | 4/1969 | Kitsuda ................. B60B 29/002 414/428 |
| 3,463,337 A * | 8/1969 | Reznicek .............. B60B 29/002 414/428 |
| 3,735,882 A | 5/1973 | Reznicek |
| 3,850,321 A | 11/1974 | Virnig |
| 4,050,597 A | 9/1977 | Hawkins |
| 10,226,964 B2 * | 3/2019 | Rucchetto ............. B60B 29/001 |
| 2005/0254923 A1 | 11/2005 | Gorski et al. |
| 2007/0182115 A1 * | 8/2007 | Groomes ............. B60B 29/002 280/79.4 |
| 2007/0286713 A1 * | 12/2007 | Giese .................... B60B 29/002 414/427 |
| 2013/0076004 A1 | 3/2013 | Perry |
| 2017/0320715 A9 * | 11/2017 | Mathieson ............. B66F 5/025 |

FOREIGN PATENT DOCUMENTS

| | | | |
|---|---|---|---|
| FR | 2419177 A1 | 10/1979 | |
| WO | WO-2006098768 A2 * | 9/2006 | ........... B60B 29/002 |
| WO | 2016197241 A1 | 12/2016 | |

* cited by examiner

WHEEL LIFTING DEVICE

CROSS-REFERENCE TO RELATED APPLICATIONS

This application claims priority to Swedish Application No. 1750547-0, filed on May 5, 2017. The disclosure of the above application is incorporated herein by reference in its entirety.

TECHNICAL FIELD

The invention concerns a device for lifting and positioning a wheel during wheel shifting on a vehicle, such as a car, a pick-up or the like.

BACKGROUND

Shifting wheels of a vehicle, e.g. shifting from summer to winter wheels and vice versa, may be cumbersome and involves heavy lifting and manipulation of the wheels. Typically, each wheel to be mounted needs to be lifted between 50-100 mm above the ground and then manipulated and positioned such that the mounting holes of the rim are aligned with the wheel hub. Thereafter, the wheel needs to be maintained in position while fastening the mounting screws or nuts. Especially at larger vehicles such as pick-up trucks, SUVs, cross country trucks, general purpose vehicles, jeeps and the like, where the wheels often are comparatively large and heavy, such lifting and handling of the wheels involves awkward working positions, is tiresome and may even lead to injuries to the person involved.

PRIOR ART

For this reason there have been suggested several devices intended to facilitate the lifting and positioning the wheels when carrying out wheel shifting. U.S. Pat. No. 4,050,597 A, US 2005/0254923 A1 and U.S. Pat. No. 3,850,321 A all disclose a previously known type of wheel lifting device comprising a first frame which is supported on wheels for moving and positioning the lifting device. A second frame which exhibits support means for the wheel to be lifted is arranged vertically movable relative to the first frame. A jack screw or a hydraulic or pneumatic jack is arranged between the first and second frame such that the second frame and the wheel to be lifted may easily be raised relative to the first frame and the ground. All these known lifting devices are comparatively complicated and comprise a large number of components. The devices are also comparatively large and require a great storage space when not in use.

WO 2016/197241 A1 discloses a wheel lift comprising a ground supported frame and wheel lifting arms connected to the frame by means of a four bar linkage structure. An operating lever is connected to the linkage for raising the lifting arms relative to the frame by pivotal movement of the operating lever. A blocking device for blocking the operating lever and the lifting arms comprises a cylinder fixed to the lever and a rod with one end telescopically received in the cylinder and the other end fixed to the frame. Relative telescopic movement between the cylinder and the rod may be blocked and allowed by means a break which is activated and deactivated by operating a handle which is fixed to the lever and connected to the brake via a cable. This device requires simultaneous operation of the lever and the brake handle for raising the lifting arms and locking them at the desired position.

SUMMARY OF THE INVENTION

An object of the present invention is to provide an enhanced wheel lifting device to be used when shifting wheels of a vehicle.

Another object is to provide such a device which requires only one operation of a single manoeuvring member for lifting the wheel to the desired position and locking the wheel at this position.

A further object is to provide such a device which provides automatic releasable locking of a wheel supporting frame when it has been raised to a desired position.

A still further object is to provide such a device which allows stepless adjustment of the height to which the wheel is to be lifted.

Yet another object is to provide such a device which is simple in construction and which comprises a low number of constituent parts.

A still further object is to provide such a lifting device which is easy to use and reliable.

A still further object is to provide such a device which may readily be produced in a cost efficient manner.

These and other objects are achieved by a wheel lifting device of the type specified in the introductory part of claim 1 and which exhibits the special technical features defined by the characterizing portion of the claim. The wheel lifting device comprises a base structure with support means for being supported by a ground surface and a lifting frame with at least one wheel support member and a frame leg which extends upwardly at an angle to the ground surface when the base structure is supported on the ground surface. A link mechanism is connected to the chassis and to the lifting frame. A pivotal manoeuvring lever is connected to link mechanism for lifting the lifting frame relative to the base structure. A blocking device is arranged for locking the manoeuvring lever at any desired pivotal position. The blocking device comprises a weight which is slidable along the frame leg and arranged to intersect the pivotal movement path of the manoeuvring lever and to be brought into frictional engagement with the frame leg when influenced by a force generated by the manoeuvring lever in order to block the lifting frame from downward movement relative to the base structure.

The so arranged wheel lifting device allows for that the blocking device, during pivotal lifting movement of the manoeuvring lever in a first direction, under the influence of gravity and in contact with the manoeuvring lever, follows the lever until the lifting frame has reached the desired position. At this position the lever may be released whereby the gravity acting on the lifted wheel and the lifting frame will cause the lever to exert a blocking force on the blocking device in a second direction being opposite to the first direction. The so created blocking force brings the blocking device automatically into blocking frictional engagement with the frame leg whereby rotation of the lever in the second direction is prevented. For lifting the lifting frame and the wheel to the desired position it thus suffice merely to pull the manoeuvring until the wheel has reached the desired position and thereafter to release the lever. The blocking device then immediately blocks the lever at this position without the need of any additional blocking or braking operation. The wheel lifting device may thus easily be fully manoeuvred by the use of a single hand.

An additional advantage is that the continuous sliding movement of the blocking device along the frame leg provides stepless adjustment of the lifting position.

The weight may exhibit a recess which receives a longitudinal portion of the frame leg with a specific clearance.

The recess may exhibit opposing edges, each having an extension x generally in parallel with the longitudinal direction of the frame leg; the manoeuvring lever being arranged to make contact with the weight at a first distance y from a centre line between the opposing edges; and wherein x<0.2y.

The weight may have a centre of gravity which is positioned at a second distance z, from the centre line between the opposing edges, in the direction of first distance y; and wherein x>0.6z.

The centre of gravity may be positioned at a third distance w from the centre line between the opposing edges in a direction which is perpendicular to the directions of extension x and first distance y; and wherein x>1.2w.

The weight and the frame leg may be arranged to prevent rotation of the weight about the longitudinal axis of the frame leg.

The recess and the frame leg may have corresponding form locking cross sectional forms.

The recess and the frame leg may have corresponding polygonal cross sections, preferably square cross sections.

The link mechanism may comprise a lever shaft which is rotationally connected to the lifting frame and which exhibits two radially extending link levers which are rotationally connected to the base structure.

The link mechanism may comprises two auxiliary link levers which are rotationally connected to the lifting frame and the base structure.

The manoeuvring lever may be fixed to the lever shaft.

The base structure may comprise two base rods which extend in parallel and are mutually connected by means of the link mechanism.

The lifting frame may comprise two wheel support members extending in parallel.

The lifting frame may comprise two frame legs each extending essentially perpendicular from a respective wheel support member and the frame legs may be mutually connected by a transverse handle rod.

The lifting frame may be formed in one piece by bending a tubular blank.

Each wheel support member may be provided with a roller arranged to allow a wheel supported by the wheel support members to be rotated.

Additional objects and advantages of the invention will appear from the following detailed description and from the appended claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The terms vertical and horizontal used herein refer to directions of the device when it is in an upstanding position such that the lifting action may be carried out in the vertical direction. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5*a* illustrates blocking and FIGS. 5*b-c* illustrates release of the blocking device.

DETAILED DESCRIPTION

Figure 1:
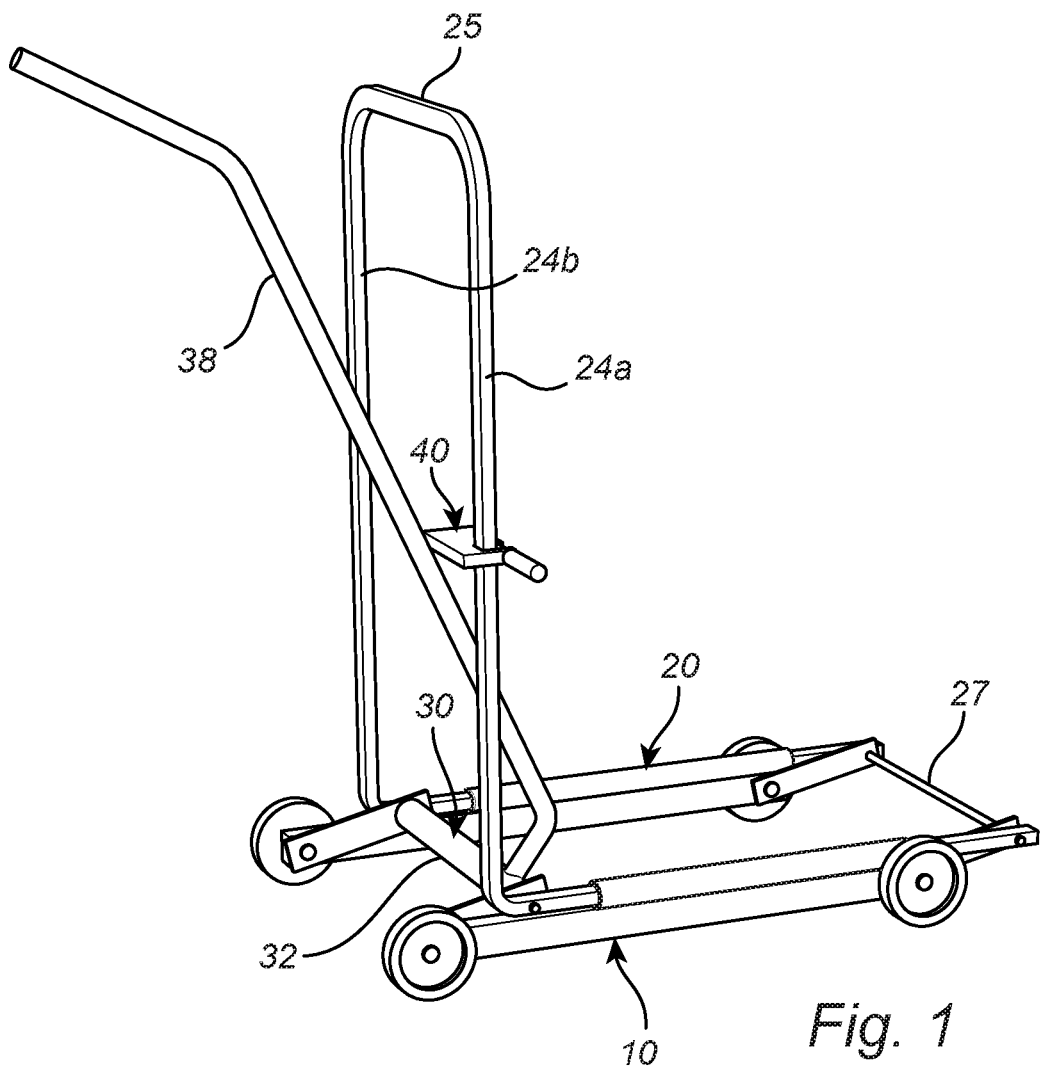
FIG. 1 is a perspective view illustrating a wheel lifting device according to an embodiment of the invention where the lifting frame is in a first lower position.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. Throughout this specification, the terms vertical and horizontal refers to directions of the lifting device when positioned in an upright standing position such as illustrated in the figures.

As shown in FIGS. 1-4, the wheel lifting device comprises a base structure 10 and a lifting frame 20 which is arranged to support a wheel (not shown) to be lifted into position at a vehicle. The lifting frame 20 comprises two wheel supporting members in the form of horizontal support legs 22*a*, 22*b* each of which extends essentially perpendicular from a first end of a respective frame leg in the form of vertical leg 24*a*, 24*b*. The vertical legs 24*a*, 24*b* are, at their second ends, mutually connected by means of a transvers handle rod 25. The support legs 22*a*, 22*b* are mutually connected by means of a transverse rod 27 which extends between respective front ends of the support legs, said front ends being distal to the junction with the frame legs 24*a*, 24*b*. Each support leg 22*a*, 22*b* is provided with a roller 26*a*, 26*b* which allows a wheel supported by the support legs to be rotated about its rotational centre axis for facilitating alignment of the wheel's fixation holes with corresponding fixations holes or bolts on the wheel hub of the vehicle. In the shown example, the rollers 26*a*, 26*b* are formed of cylindrical hollow sleeves which are rotationally threaded onto a respective support leg 22*q*, 22*b*. The support legs 22*a*, 22*b*, the frame legs 24*a*, 24*b* and the handle rod 25 are all formed of tubular rods. Hereby the frame 20 may readily be manufactured in one single piece by a few fast and cost effective bending operations of a tubular blank. In the shown example the frame 10 has been produced by bending a tubular blank having square cross section.

The frame 20 is connected to the base structure 10 by means of a link mechanism 30 for allowing the frame 20 to be raised and lowered in relation to the base structure 20.

The base structure 10 comprises at least two wheels 12 arranged to be supported by the ground floor. In the shown example the base structure 10 comprises four wheels 12. The wheels 12 allow the wheel lifting device to be correctly positioned in relation to the vehicle at which a wheel is to be shifted. In the shown example, the base structure 10 further comprises two parallel base rods 14a, 14b which are mutually connected by means of the link mechanism 30.

In the shown example, the link mechanism 30 comprises a lever shaft 32 which, at its opposing ends, is rotationally connected to a respective support leg 22a, 22b of the frame 30. The lever shaft 32 comprises two radially extending link levers 34a, 34b, which are fixed to a respective end portion of the lever shaft 32. The link levers 34a, 34b are pivotally connected to a first end portion of a respective base rod 14a, 14b of the base structure 10. Two auxiliary link levers 36a, 36b are pivotally connected to respective second end portions of the base rods 14a, 14b and, by means of the transverse rod 27, to the support legs 22a, 22b of the frame. Rotation of the lever shaft 32 will thus cause the link levers 34a, 34b, 36a, 36b to pivot relative to the frame 20 and the base structure 10 and thereby to increase the vertical distance them between. During this vertical movement, the frame 20 and the base structure 10 will also move horizontally relative to each other. By keeping the frame 20 horizontally fixed, the wheels 12 allow the base structure 10 to move horizontally relative to the frame and the ground floor, thereby maintaining the horizontal position of the frame 20 and the wheel to be attached to the vehicle.

The link mechanism 30 is operated by means of a manoeuvring lever 38, which in the shown example is fixed to the lever shaft 32. Pulling the manoeuvring lever 38 will cause the lever shaft 32 to rotate anti-clockwise as seen in the pictures, thereby raising the frame 20 relative to the base structure 10.

Figure 3:
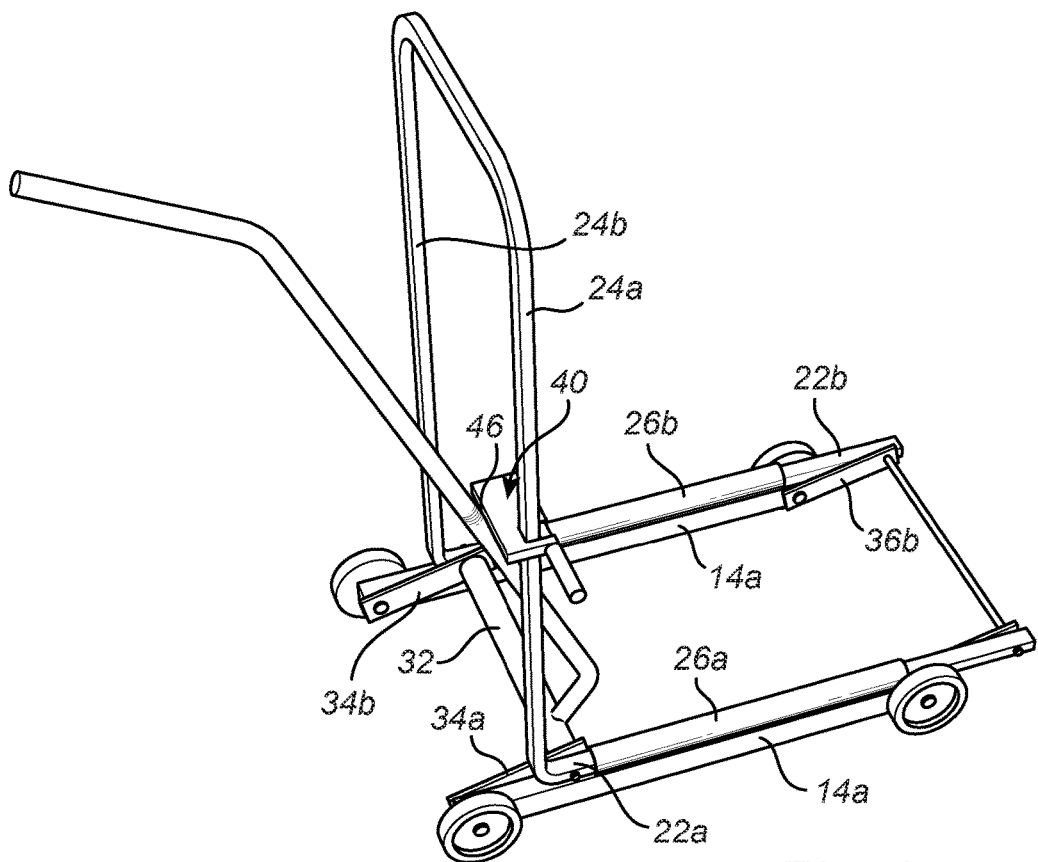
FIG. 3 is a perspective view of some parts, in enlarged scale, of the wheel lifting device in FIG. 1.
Figure 4:
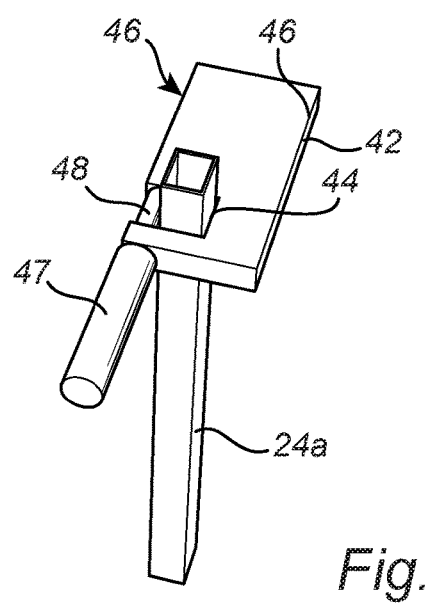
FIG. 4 is a perspective view illustrating a frame leg and a blocking device comprised in the wheel lifting device shown in FIG. 1.

The wheel lifting device further comprises a blocking device 40 which is arranged to counteract the gravity acting on the lifting frame 20 and maintain the frame 20 in any desired lifted position. As best seen in FIGS. 3 and 4, the blocking device 40 comprises a weight 42 which is slideably mounted to one 24a of the vertical legs of the frame 20. The vertical leg 24a is constituted by a tube having a square cross section and the weight 42 exhibits a U-shaped recess 44. The width of the recess 44 is somewhat wider than the width of the vertical leg's 24a cross section, such that the weight may slide up and down along the vertical leg 24a.

Figure 2:
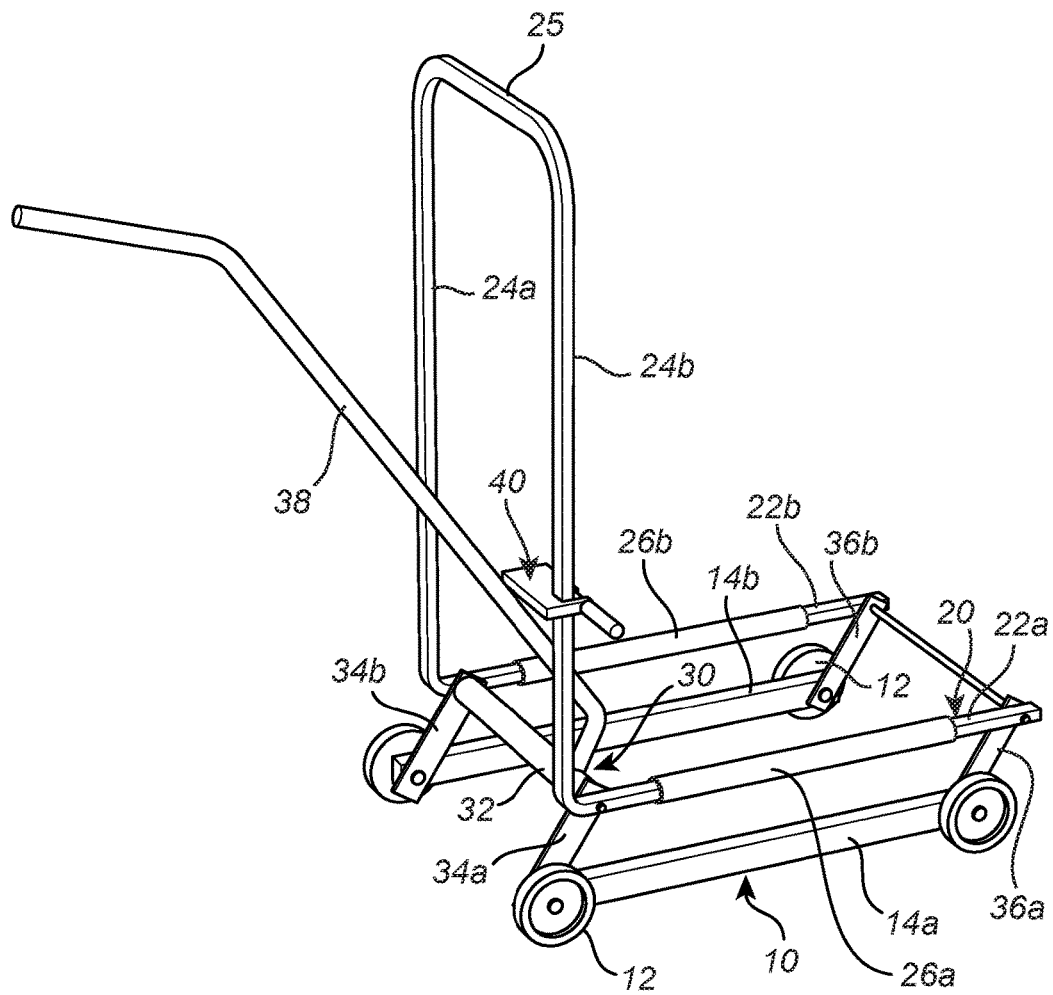
FIG. 2 is a perspective view of the wheel lifting device in FIG. 1 where the lifting frame has been lifted to a second upper position.
Figure 5A:
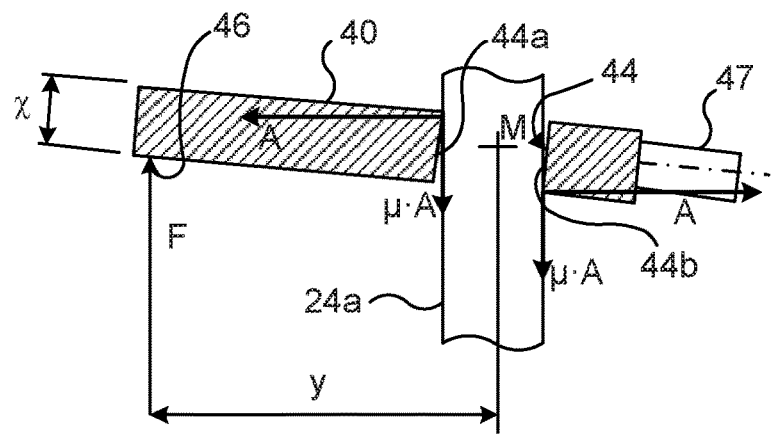
FIGS. 5*a-c*, are schematic drawings illustrating the dimensions of and the forces acting on a blocking device of a wheel lifting device according to the invention.

The vertical leg 24a and the weight 42 are arranged such that a portion 46 of the weight, which portion 46 extends horizontally out from the vertical leg 24a, may intersect the pivotal movement path of the manoeuvring lever 38. When gravity acts on the lifting frame 20, the gravitational force will be transmitted via the link mechanism 30 to the manoeuvring lever 38, thereby urging the manoeuvring lever to rotate in the clockwise direction as seen in FIGS. 1 and 2. When making contact with the extended portion 46 of the weight 42, the manoeuvring lever 38 will exert an upwardly directed force F on the weight 42 as indicated in FIG. 5a. This force F will tilt the weight relative to the vertical leg 24a, such that opposing edges 44a, 44b of the U-shaped recess 44 make frictional contact with the vertical leg 24a. This friction prevents the weight 42 from being forced to slide upwardly along the vertical leg 24a, whereby the weight 42 blocks further clockwise rotation of the manoeuvring lever 38 and maintains the lifting frame 20 in the raised position in spite of the gravity acting on the lifting frame 20.

In the example shown, the blocking device 40 further comprises a handle 47 which comprises a bolt 48 which is threaded into the weight such that the U-shaped recess is closed and the weight is prevented from coming loose from the vertical leg 24a.

FIG. 1 illustrates the wheel lifting device in a lower starting position. The horizontal support legs 22a, 22b of the frame 20 rest against the base structure 10, whereby the manoeuvring lever 38 does not exert any appreciable force to the blocking device 40. The weight 42 of the blocking device 40 is influenced by gravity and rests on the manoeuvring lever 38. From this position, it is possible to raise the frame 20 by manually pulling the manoeuvring lever 38 as described above. Upon anti-clockwise rotation of the manoeuvring lever 38, the lifting frame is raised and the weight 42 simultaneously slides downwardly along the vertical leg 24a, thereby following the movement of the manoeuvring lever 38. When the lifting frame has reached the desired position, e.g. as shown in FIG. 2, it is possible to let go of the manoeuvring lever 38, whereby the blocking device 40, as described above, immediately will block the manoeuvring lever 38 from returning towards the starting position. For allowing the weight 42, under influence of the gravity, to automatically slide downwardly along the vertical leg 24a, this leg should be arranged at an sufficient great angle to the horizontal. In the shown example the vertical leg 24a is arranged approximately normal to the support plane defined by the four wheels 12. Satisfactory sliding of the weight can however be achieved also when the longitudinal direction of the vertical leg 24a deviates somewhat from the normal to the support plane. Typically, the vertical leg 24a should not deviate more than approx. 20° from the normal to the support plane.

For returning the frame 20 and the manoeuvring lever 38 to the starting position shown in FIG. 1 it suffices to grip the handle 47 of the blocking device 40 and to manually slide the weight 42 upwardly along the vertical leg while keeping the weight 42 approximately non-tilted relative the vertical leg 24a, such that the friction between the edges of the U-shaped recess 44 and the vertical leg 24a is eliminated or reduced.

Example

In the following and with reference to FIG. 5a, the conditions needed to be fulfilled for the blocking device 40 to prevent the lifting frame 20 from being lowered once the desired position has been reached and the manoeuvring lever 38 released is discussed. When the operator has raised the lifting frame 20 to the desired position and let go of the manoeuvring lever 30, the weight of the lifted wheel and the lifting frame 20 will influence the blocking device 40 by the force F. The vertical leg 24a having square cross section is received with a small clearance in the U-shaped recess 44 having opposing edges 44a, 44b. An edge pressure is thereby created between the blocking device 40 and the vertical leg 24a. The force A acting on the vertical leg is by reasons of equilibrium equal at both opposing sides of the vertical leg 24a. By friction between the blocking device 40 and the vertical leg, frictional forces μA are created.

The torque about centre axis M is:

$$Fy - 2Ax/2 = 0 \Rightarrow A = Fy/x$$

Where x is the extension of the edges 44a, 44b in the direction generally in parallel with the longitudinal direction of the vertical leg 24a and y is the distance between the point where the manoeuvring lever 46 makes contact with the weight 42 and the centre line between the edges 44a, 44b.

The condition for reaching blocking of the blocking device is:

$$2\mu A > F \Rightarrow \mu > F/(2A) = x/(2y)$$

Where μ is the coefficient of friction.

If, for example, x=12 mm and y=60 mm this means that µ>0.1 results in that the blocking device is frictionally locked to the vertical leg. If the material of the blocking device and the vertical leg are chosen such that this condition is fulfilled the blocking device will be blocked in a satisfactory manner.

In the following and with reference to FIGS. 5b and c, the conditions needed to be fulfilled for the blocking device 40 be released and allowed to slide along the vertical leg 24a will be discussed.

When, from the blocked position, the operator pulls the manoeuvring lever 38 anti clockwise (as seen in FIGS. 1-3), the force F ceases to act on the blocking device. The blocking device 40 is thereafter influenced by its dead mass m with the force mg according to FIG. 5b. Also in this case an edge pressure B arises between the blocking device 40 and the vertical leg 24a. The distance between the centre of gravity CG of the blocking device and the centre point M is designated z.

The torque about centre axis M is then:

$$2Bx/2-mg=0 \Rightarrow B=mgz/x$$

The condition for not reaching blocking of the blocking device and thus for allowing the blocking device to be displaced along the vertical leg is then:

$$2\mu B<mg \Rightarrow \mu<mg/(2B)=x/(2z)$$

If for example x=12 and z=10 this means that the condition for releasing the blocking device is µ<0.6.

Figure 5B:
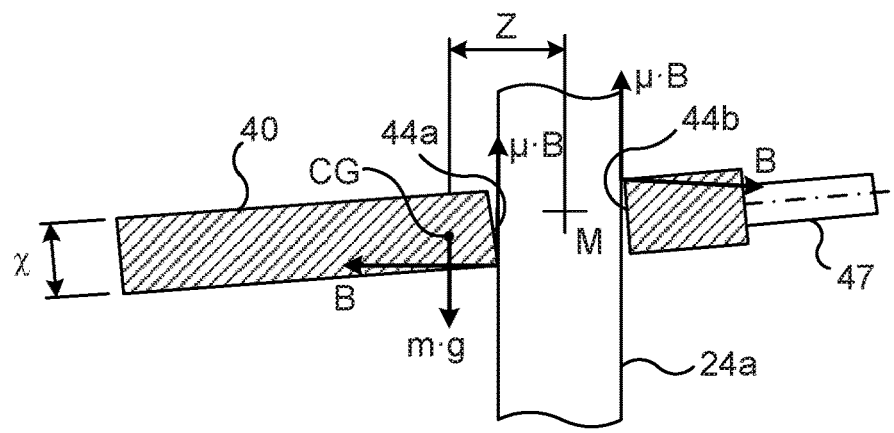
Figure 5C:
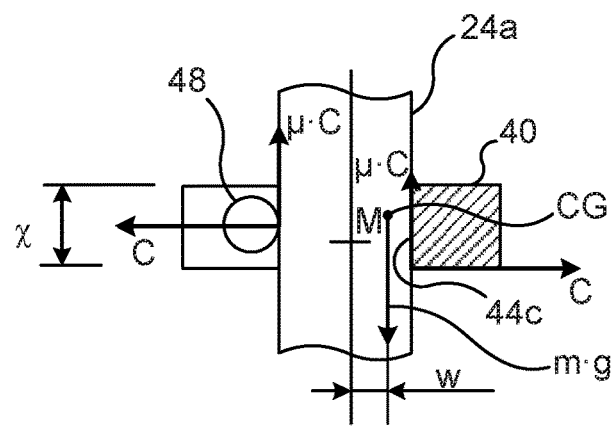

FIG. 5c is a section through the blocking device perpendicular to the direction of FIG. 5b. The circumstances are here somewhat different since the reactional forces act partly on the cylindrical portion of the bolt 48 and partly on the edge 44c of the recess 44.

The torque about centre axis M is then:

$$2Cx/2-mgw=0 \Rightarrow C=2mgw/x$$

The condition for not reaching blocking of the blocking device and thus for allowing the blocking device to be displaced along the vertical leg is then:

$$2\mu C<mg \Rightarrow \mu<mg/(2C)=x/(4w)$$

If for example x=12 mm and w=5 mm this means that the condition for releasing the blocking device is µ<0.6.

The example shows that both the condition for frictional locking the blocking device 40 relative to the vertical leg 24a and for allowing displacement by releasing said frictional locking may be fulfilled if the geometrical dimensions of the blocking device 40 and the cross section of the vertical leg are chosen according to the principals described above and by choosing materials of the blocking device and the vertical leg which in combination fulfil the requirement on the coefficient of friction µ. In the shown example the coefficient of friction should lie within the interval:

$$0.1<\mu<0.6$$

This condition is fulfilled by many material combinations. It is for example possible to make both the blocking device 40 and the vertical leg 24a of steel and cover the contacting surfaces by many traditional industrial coatings.

Now, starting from the above described conditions for accomplishing the desired blocking and release of the blocking device and from coefficients of friction of suitable constructional materials it is possible to determine preferred geometrical dimensions of the blocking device 40. Many constructional materials such as coated steel exhibit a coefficient of friction µ in the range of 0.1<µ<0.3.

Applying the first condition for accomplishing blocking gives:

$$0.1>x/(2y) \Rightarrow x<0.2y$$

Applying the conditions two for accomplishing release gives:

$$0.3<x/(2z) \Rightarrow x>0.6z \text{ and}$$

$$0.3<x/(4w) \Rightarrow x>1.2w$$

Above an exemplifying embodiment of the wheel lifting device according to the invention has been described. It is however readily understood that the invention is not limited to the above description and that the invention may be varied in numerous ways in accordance with the appended claims. For example the lifting frame may be formed in other ways than by bending a square tube blank, e.g. by bending tubes of other cross sectional geometries, such as other polygonal, oval or other non circular geometries. Even circular geometries may be used but at such instances other means should be provided for preventing the blocking device to rotate relative to the frame leg about the longitudinal axis of the frame leg. The frame may also be formed by other means than bending a tubular blank such as by welding, soldering or screw fixing together discrete components. Bending of a singular tubular blank is however preferred since it has proven to result in a very fast, simple and cost effective way of producing the frame. Instead of being formed of steel the frame and the blocking device may be constituted of or comprise other materials as long as the coefficient of friction and the geometries are chosen such that the above described conditions for accomplishing blocking and release of the blocking device are assured.

The invention claimed is:

1. A wheel lifting device comprising:
   a base structure with support means for being supported by a ground surface;
   a lifting frame with at least one wheel support member and a frame leg which extends upwardly at an angle to the ground surface when the base structure is supported on the ground surface;
   a link mechanism connected to the base structure and to the lifting frame;
   a pivotal manoeuvring lever connected to the link mechanism for lifting the lifting frame relative to the base structure; and
   a blocking device for locking the manoeuvring lever at any desired pivotal position,
   characterized in that the blocking device comprises a weight which is slidable along the frame leg and arranged to intersect the pivotal movement path of the manoeuvring lever and to be brought into frictional engagement with the frame leg when influenced by a force generated by the manoeuvring lever in order to block the lifting frame from downward movement relative to the base structure.

2. A wheel lifting device according to claim 1, wherein the weight exhibits a recess which receives a longitudinal portion of the frame leg with a specific clearance.

3. A wheel lifting device according to claim 2, wherein the recess exhibits opposing edges, each having an extension x generally in parallel with a longitudinal direction of the frame leg; the manoeuvring lever is arranged to make contact with the weight at a first distance y from a centre line between the opposing edges; and wherein x<0.2y.

4. A wheel lifting device according to claim 3, wherein the weight has a centre of gravity which is positioned at a second distance z, from the centre line between the opposing edges, in the direction of first distance y; and wherein x>0.6z.

5. A wheel lifting device according to claim 4, wherein the centre of gravity is positioned at a third distance w from the centre line between the opposing edges in a direction which is perpendicular to the directions of extension x and first distance y; and wherein x>1.2w.

6. A wheel lifting device according to claim 2, wherein the weight and the frame leg are arranged to prevent rotation of the weight about the longitudinal axis of the frame leg.

7. A wheel lifting device according to claim 6, wherein the recess and the frame leg have corresponding form-locking cross sectional geometries.

8. A wheel lifting device according to claim 7, wherein the recess and the frame leg have corresponding polygonal cross sections.

9. A wheel lifting device according to claim 1, wherein the link mechanism comprises a lever shaft which is rotationally connected to the lifting frame and which exhibits two radially extending link levers which are rotationally connected to the base structure.

10. A wheel lifting device according to claim 9, wherein the link mechanism comprises two auxiliary link levers which are rotationally connected to the lifting frame and the base structure.

11. A wheel lifting device according to claim 9, wherein the manoeuvring lever is fixed to the lever shaft.

12. A wheel lifting device according to claim 1, wherein the base structure comprises two base rods which extend in parallel and are mutually connected by means of the link mechanism.

13. A wheel lifting device according to claim 1, wherein the lifting frame comprises two wheel support members extending in parallel.

14. A wheel lifting device according to claim 13, wherein the lifting frame comprises two frame legs each extending essentially perpendicular from a respective wheel support member and wherein the frame legs are mutually connected by a transverse handle rod.

15. A wheel lifting device according to claim 1, wherein the lifting frame is formed in one piece by bending a tubular blank.

16. A wheel lifting device according to claim 1, wherein each wheel support member is provided with a roller arranged to allow a wheel supported by the wheel support members to be rotated.

17. A wheel lifting device according to claim 7, wherein the recess and the frame leg have corresponding square cross sections.

* * * * *